Nov. 30, 1965  H. C. SWIFT  3,220,516
AUTOMATIC BRAKE ADJUSTING MECHANISM
Filed Feb. 4, 1964  2 Sheets-Sheet 2

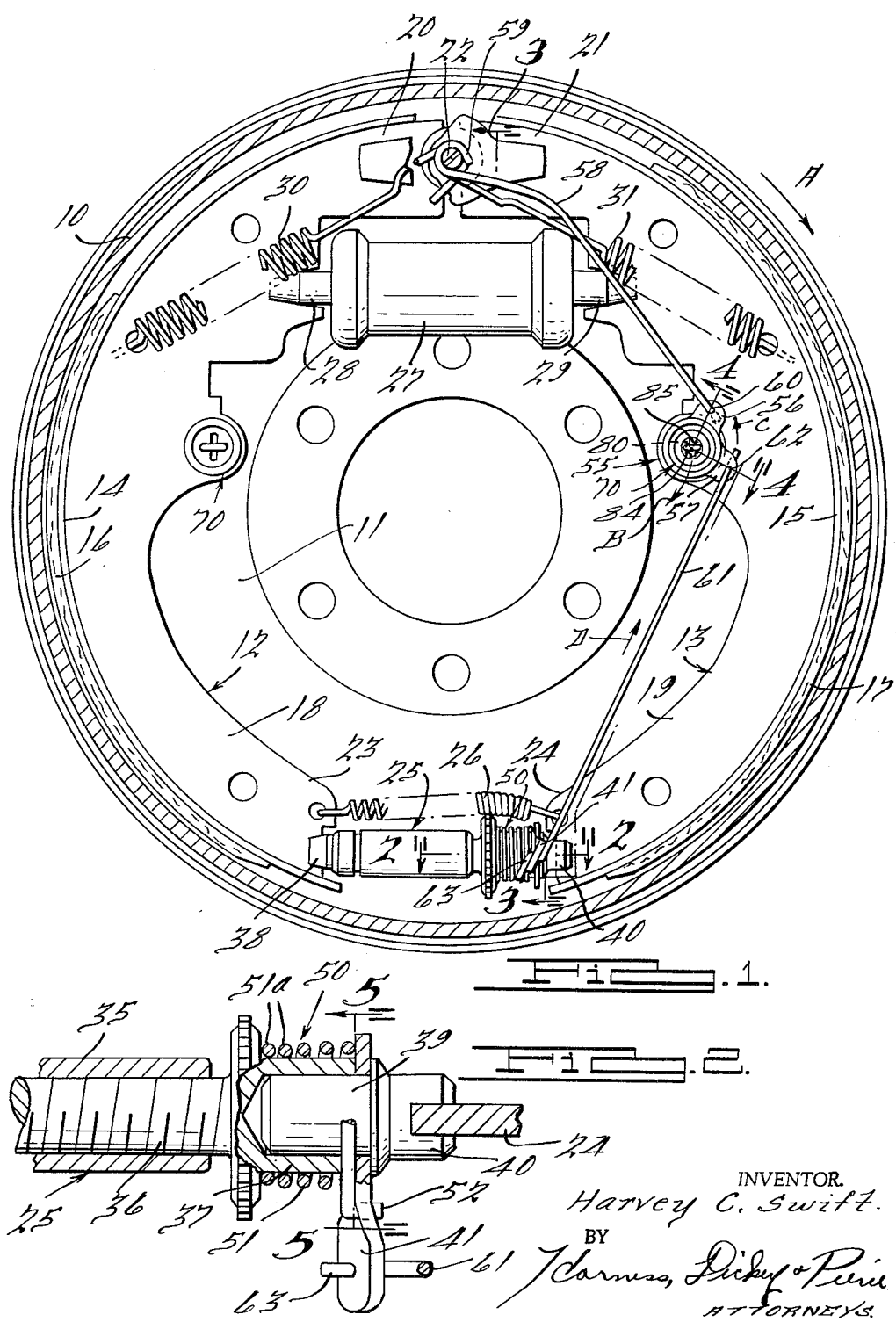

INVENTOR.
Harvey C. Swift.
BY
Carness, Dickey & Pierce.
ATTORNEYS.

United States Patent Office 3,220,516
Patented Nov. 30, 1965

3,220,516
AUTOMATIC BRAKE ADJUSTING MECHANISM
Harvey C. Swift, Birmingham, Mich., assignor to Kelsey-Hayes Company, Romulus, Mich., a corporation of Delaware
Filed Feb. 4, 1964, Ser. No. 342,373
3 Claims. (Cl. 188—79.5)

This invention relates to brakes of the type comprising an annular brake drum and arcuate brake shoes and, more particularly, to means for automatically adjusting the brakes when the wear on the brake shoes requires such adjustment.

An important object of this invention is to provide an automatic adjusting means for brakes which is so reduced in the number and character of its component parts as to approach the ultimate in structural simplicity.

Another object of the invention is to provide a device of this type wherein the structural simplicity thereof creates an economy in its manufacture, installation and maintenance costs.

A still further object of the invention is to provide automatic adjusting means of this type which is activated or cocked only when the brakes are applied with the vehicle moving in a reverse direction and which does not interfere with the normal operation of the brakes during the forward movement of the vehicle.

Another object of the invention is to further simplify the construction by combining the usual holddown spring device with the bell crank lever of the clutch actuating mechanism so that this one unit serves two purposes.

The objects of this invention are attained by the use of a coiled spring type clutch adapted to embrace the movable part of an adjustable strut located between adjacent ends of the brake shoes. The clutch is connected to one of the brake shoes whereby, upon movement of this brake shoe in one direction, said clutch will engage the movable part of the adjustable strut to actuate the same to adjust the brake shoes. The construction and arrangement of the parts are such as to accomplish the objects of this invention in a simple but effective manner.

The various objects and advantages, and the novel details of construction of one commercially practical embodiment of the inventon, will become more apparent as this description proceeds, especially when considered in connection with the accompanying drawings, in which:

FIGURE 1 is a sectional elevational view of a brake assembly showing the device of this invention incorporated therein;

FIGURE 2 is an enlarged fragmentary sectional view taken substantially on the plane indicated by line 2—2 in FIGURE 1;

Figure 3:
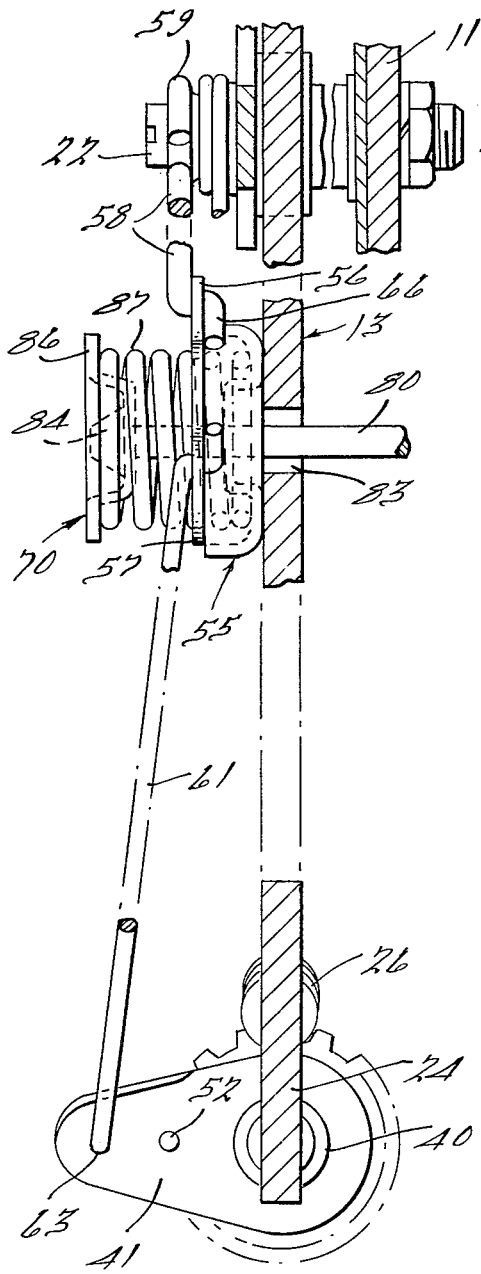
FIGURE 3 is an enlarged vertical sectional elevational view, partly broken away, taken substantially on the plane indicated by line 3—3 in FIGURE 1.

The illustrative embodiment of the invention is shown in the drawings as applied to a brake structure of the internal expanding type comprising arcuate brake shoes adapted to cooperate with the inner surfaces of the brake drum. In FIGURE 1, the reference character 10 indicates a brake drum mounted on the wheel hub of a vehicle (not shown) for rotation therewith. A stationary backing plate 11 is mounted on a stationary part (not shown) of the vehicle.

The basic elements of the brake structure comprise a pair of brake shoes 12 and 13 in the form of arcuate segments, said brake shoes being provided with arcuate rim portions 14 and 15 supporting lining elements 16 and 17, respectively. The rim portions 14 and 15 are reinforced against flexure by web portions 18 and 19 extending perpendicular from the rim portions 14 and 15.

The adjacent ends 20 and 21 of the brake shoes 12 and 13 engage an anchor pin 22 fixed to the backing plate 11. The opposite adjacent ends 23 and 24 of the brake shoes 12 and 13 engage an adjustable or extensible strut 25, the shoe ends 23 and 24 being retained in engagement with the extensible strut 25 by means of a tension spring 26.

A hydraulic wheel cylinder 27 having plunger members 28 and 29 extending from opposite ends thereof into engagement with the brake shoe webs 18 and 19 provides the actuating device for moving the brake shoes 12 and 13 into engagement with the brake drum 10. The plunger members 28 and 29 extend from piston members (not shown) within the wheel cylinder 27, hydraulic fluid being directed into the wheel cylinder between the piston members from a conventional pedal operated master cylinder (not shown). Retraction springs 30 and 31 normally move the ends 20 and 21 of the brake shoes in engagement with the anchor pin 22 when hydraulic pressure is released from the wheel cylinder 27.

In the type of brake thus far described, it will be understood that the brake shoe 13 constitutes the secondary shoe and that this shoe moves away from the anchor pin 22 when the brake is applied while the vehicle is moving in reverse and the brake drum is moving in the direction of arrow A in FIGURE 1. As will be explained more fully hereinafter, the brake shoes 12 and 13 are adjusted only upon the return movement of the secondary shoe 13 after the brakes have been applied while the vehicle is moving in a reverse direction.

The adjustable or extensible strut for adjusting the brake shoes, indicated generally by the reference character 25, comprises a tubular internally threaded sleeve 35 which receives the threaded stem 36 of the adjustable or movable portion of the strut. The stem portion 36 is provided with a sleeve portion 37 at one end thereof. The sleeve 35 is provided with a bifurcated or slotted portion 38 to receive the end 23 of the web 18 of the brake shoe 12, thus preventing rotation of the sleeve 35. The sleeve portion 37 is adapted to rotatably receive and support a plug member 39 having a slotted or bifurcated portion 40 adapted to engage the end 24 of the brake shoe 13. Rotatably mounted on the member 39 is a clutch operating lever 41.

In accordance with this invention, the movable part 36 of the extensible strut is adapted to be rotated in one direction by means of a one-way clutch 50 in the form of a helical coil spring 51 surrounding or embracing the sleeve portion 37 of the movable part 36. The coils of this spring are wound right-handed so that when the end 52 of the spring, which engages an aperture in the clutch operating lever 41, is moved upwardly, as viewed in the drawings, the spring with be tightened upon the sleeve 37 so as to grip the same and rotate the movable part 36 of the strut and thus adjust the same. To facilitate this, the first one or two convolutions 51a of the spring are wound more tightly around the sleeve portion 37 than the remaining convolutions. When the end 52 of the spring is moved in the opposite direction, the spring will unwind and slip on the sleeve 37 so as to occupy a new position thereon preparatory to the next adjusting operation of the adjustable strut.

The spring clutch 50 is actuated to grip the sleeve 37 and rotate the rotatable part 36 of the extensible strut when the secondary shoe 13 is moved into engagement with the anchor 22 by spring 31, which it does when the brakes are released after an application of the brakes while the vehicle is moving in a reverse direction.

Mounted on the secondary shoe 13 is a bell crank lever 55 in the form of a dished disk-like member having a pair of circumferentially spaced arms 56 and 57. The bell crank lever is connected to the anchor pin 22 by means of a rod or link 58 having an end 59 pivotally connected to the anchor pin 22. The other end of the rod or link 58 has a hooked end 60 engaging an aperture in the bell crank arm 56. The other arm 57 of the bell crank lever is connected by a rod or link 61 which has a hooked-shaped end 62 engaging an aperture in the arm 57 and the other end of the rod or link 61 is connected to the clutch operating arm 41 by means of a hooked end 63.

The bell crank lever 55 is mounted on the web 19 of the brake shoe 13 for bodily movement therewith and for rocking movement relative thereto about the bell crank pivot, yet to be referred to.

Figure 4:
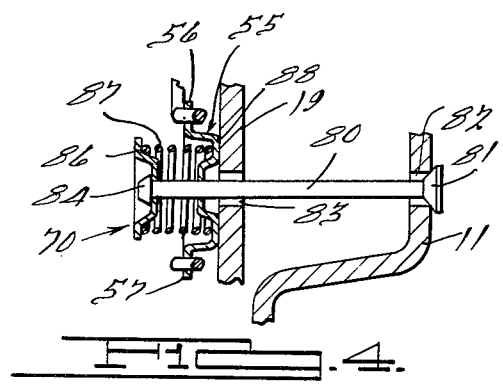
FIGURE 4 is an enlarged detail sectional view taken on line 4—4 in FIGURE 1.
Figure 5:
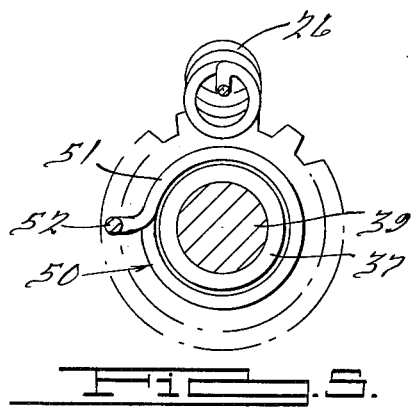
FIGURE 5 is a detail sectional view taken on line 5—5 in FIGURE 2.

In order to simplify the construction and to thus reduce its manufacturing costs and facilitate its assembly, the bell crank lever is rotatably mounted on the pin or rod of one of the conventional spring actuated holddown devices 70, at least one of which is associated with each brake shoe to urge the brake shoe towards the backing plate 11. As shown particularly in FIGURE 4, these conventional type holddown devices consist of a pin or rod 80 provided with a headed portion 81 which loosely engages the periphery of an aperture 82 in the backing plate 11. The rod or pin 80 projects loosely through an aperture 83 in the web 19 of the brake shoe and is provided with a flattened head 84 which is passed through a slot 85 in a washer or abutment member 86. The head 84 is then turned crosswise of the slot 85 to hold the washer 86 assembled on the end of the rod 80. The reference character 87 indicates the usual spring employed to urge the brake shoe towards the backing plate. In the construction shown in FIGURE 4, one end of the spring engages the washer 86 and the other end engages an annular groove 88 in the bell crank lever 55. Thus, the spring urges the bell crank lever 55 against the web 19 of the brake shoe 13 which, in turn, is urged towards the backing plate 11 in the manner conventional with holddown devices used in brakes of this type.

From the structure just described, it will be apparent that the pin or rod 80 forms the pivot for the bell crank lever and that separate or independent means for mounting the bell crank lever is eliminated.

In operation, when the brakes are applied and the vehicle is moving in a reverse direction, the brake shoe 13 moves away from the anchor pin 22 to move the pivot 80 in the direction of arrow B. This will rock the bell crank 55 in the direction of arrow C because of the connection between the arm 56 and anchor pin 22 afforded by the link 58. As the bell crank 55 rocks in the direction of arrow C, the link 61 is moved in the direction of arrow D by the arm 57 to move the clutch operating lever 41 in an upward direction, as viewed in FIGURES 1 and 2. This will unwind the spring clutch 50 on the sleeve portion 37 carried by the movable part of the extensible strut and cause the spring clutch to slip on the sleeve 37 so as to occupy a new position thereon preparatory to the next adjusting operation of the extensible strut. When the brakes are released, the spring 31 will return shoe 13 to its original position in engagement with anchor pin 22. Thereupon, the link 61 will move in a direction opposite to that indicated by the arrow D and the spring 51 will be tightened on the sleeve 37 to grip the same and to rotate the rotatable strut part and thus extend the extensible strut 25 and cause an adjustment of the brake shoes.

It will be understood that the one-way spring clutch of this invention is designed to adjust the adjustable strut only when the brakes are released after an application of the brakes while the vehicle is moving in a reverse direction. The normal application of the brakes while the vehicle is moving in a forward direction will not cause the clutch to function, because it will merely slip idly around the sleeve portion 37 of the movable strut part.

From the foregoing description of the device, it will be apparent that an automatic brake adjusting means is provided which is so reduced in the number and character of its component parts as to approach the ultimate in structural simplicity. Also, the device comprises a minimum number of simple parts whereby it may be manufactured, assembled, and maintained at a minimum cost. The use of one of the spring holddown devices as the pivot for the bell crank simplifies the construction and reduces its cost.

While one commercially practical embodiment of the invention has been described and illustrated herein somewhat in detail, it will be understood that various changes may be made as may come within the purview of the accompanying claims.

What is claimed is:

1. A brake mechanism comprising at least one brake shoe, a brake drum, an anchor, a backing plate, means for moving said brake shoe away from said anchor and into engagement with said brake drum, an extensible strut engaging an end of said brake shoe and having a movable part which controls the extension of said strut, a coil spring clutch embracing said movable strut part and adapted when tightened thereon to grip and rotate the same, a brake shoe holddown device comprising a rod mounted on said backing plate, a bell crank lever pivotally mounted on said rod and engaging said brake shoe, spring means engaging said bell crank lever to urge the same into engagement with said brake shoe and means connecting said bell crank lever to said anchor and to said clutch whereby movement of said brake shoe in one direction will rock said bell crank and engage said clutch with said movable strut part to actuate the same.

2. A brake mechanism comprising at least one brake shoe, a brake drum, an anchor, a backing plate, means for moving said brake shoe away from said anchor and into engagement with said brake drum, an extensible strut engaging an end of said brake shoe and having a movable part which controls the extension of said strut, a coil spring clutch embracing said movable strut part and adapted when tightened thereon to grip and rotate the same, a brake shoe holddown device comprising a rod pivotally connected to said backing plate and projecting loosely through an aperture in the web of the brake shoe, a washer on the free end of said rod, a spring between said washer and brake shoe web, a bell crank lever comprising a dished disk-like member having a pair of circumferentially spaced arms, the adjacent end of said spring engaging the dished portion of said bell crank lever to urge the bell crank lever against said brake shoe web and said brake shoe against said backing plate, said rod forming a pivotal mounting for said bell crank lever, and means connecting the arms of said bell crank lever to said anchor and to said clutch whereby movement of said brake shoe in one direction will rock said bell crank lever and engage said clutch with said movable strut part to actuate the same.

3. A brake mechanism comprising at least one brake shoe, a brake drum, an anchor, a backing plate, means for moving said brake shoe away from said anchor and into engagement with said brake drum, an extensible strut engaging an end of said brake shoe and having a movable part which controls the extension of said strut, a coil spring clutch embracing said movable strut part and adapted when tightened thereon to grip and rotate the same, a brake shoe holddown device comprising a rod pivotally connected to said backing plate and projecting loosely through an aperture in the web of the brake shoe, a washer on the free end of said rod, a spring between said washer and brake shoe web, a bell crank lever comprising a dished disk-like member having a pair of circumferentially spaced arms, the adjacent end of said spring engaging the dished portion of said bell crank lever to urge the bell crank lever against said brake shoe web and said brake shoe against said backing plate, said rod extending through a pivot opening in said bell crank lever for rotatably mounting said bell crank lever, means connecting one arm of said bell crank lever to said anchor to cause said bell crank lever to rock upon movement of said brake shoe, and means connecting the other arm of said bell crank lever to said clutch to actuate the same.

References Cited by the Examiner

UNITED STATES PATENTS

| 3,034,603 | 5/1962 | Bauman | 188—79.5 |
| 3,128,849 | 4/1964 | Swift | 188—79.5 |
| 3,131,787 | 5/1964 | Swift | 188—79.5 |

ARTHUR L. LA POINT, *Primary Examiner.*
DUANE A. REGER, *Examiner.*